United States Patent [19]

Tsunekawa et al.

[11] Patent Number: 4,467,187

[45] Date of Patent: Aug. 21, 1984

[54] AUTOMATIC FOCUSING DEVICE WHICH INHIBITS FOCUSING WHEN A LOW CONTRAST SCENE IS SENSED

[75] Inventors: Tokuichi Tsunekawa, Yokohama; Takashi Amikura, Tokyo, both of Japan

[73] Assignee: Canon Kabushiki Kaisha, Tokyo, Japan

[21] Appl. No.: 292,413

[22] Filed: Aug. 13, 1981

[30] Foreign Application Priority Data

Aug. 22, 1980 [JP] Japan .................. 55-115412

[51] Int. Cl.³ ............................ G03B 3/10
[52] U.S. Cl. ..................... 250/204; 354/402
[58] Field of Search ........... 250/201, 204, 209, 578; 354/25 R, 25 A, 31 F, 402, 404, 406–409; 356/1, 4

[56] References Cited

U.S. PATENT DOCUMENTS

| | | | |
|---|---|---|---|
| 4,004,852 | 1/1977 | Pentecost | 356/1 |
| 4,078,171 | 3/1978 | Stauffer | 250/201 |
| 4,085,320 | 4/1978 | Wilwerding | 250/201 |
| 4,247,762 | 1/1981 | Wilwerding | 250/204 |
| 4,257,705 | 3/1981 | Hosoe et al. | 356/4 X |

*Primary Examiner*—David C. Nelms
*Assistant Examiner*—Edward P. Westin
*Attorney, Agent, or Firm*—Fitzpatrick, Cella, Harper & Scinto

[57] ABSTRACT

In an automatic continuous focusing device, two detected images of an object formed by a distance detection optical system with a relative distance therebetween associated with the object distance are scanned, the obtained scanning signals are quantized to generate quantized picture element data, the relative distance between the two detected images is detected on the basis of the quantized picture element data, and an imaging optical system to be focused on the object is controlled according to the detection result. The device also provides for invalidating the control of the imaging optical system when the results of detection of the quantized condition of the scanning signals indicate that the quantized condition of the scanning signals for at least one of the two detected images is not sound or reasonable.

11 Claims, 4 Drawing Figures

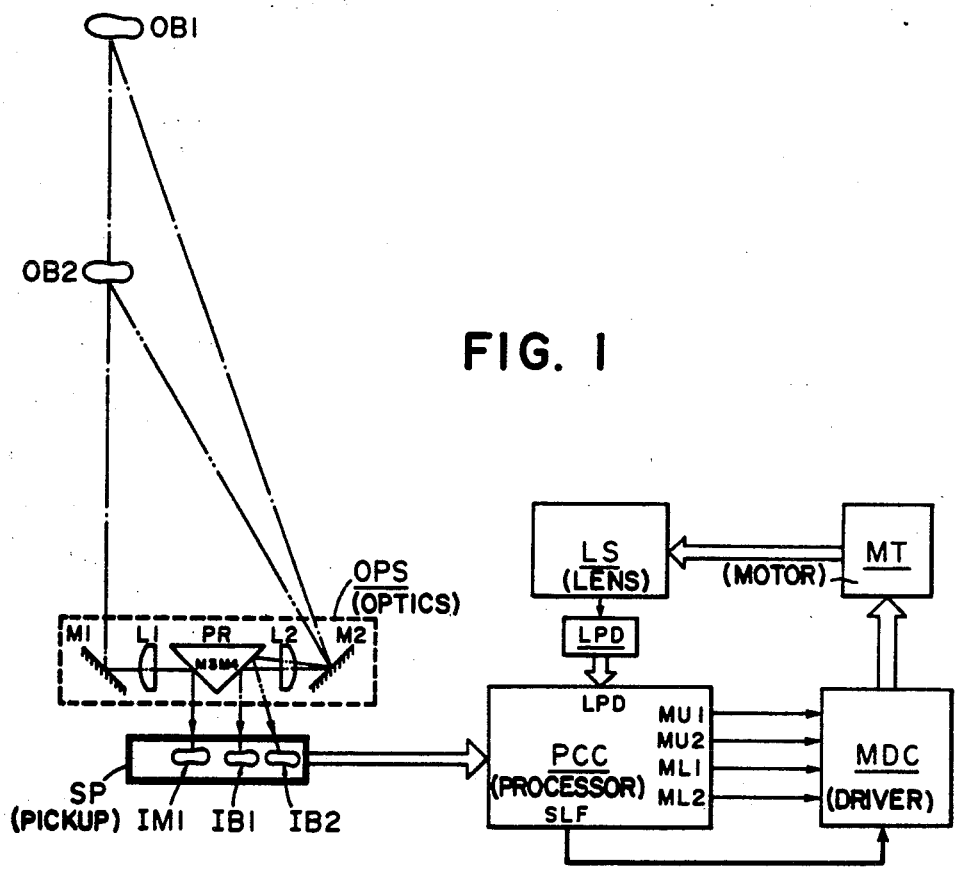
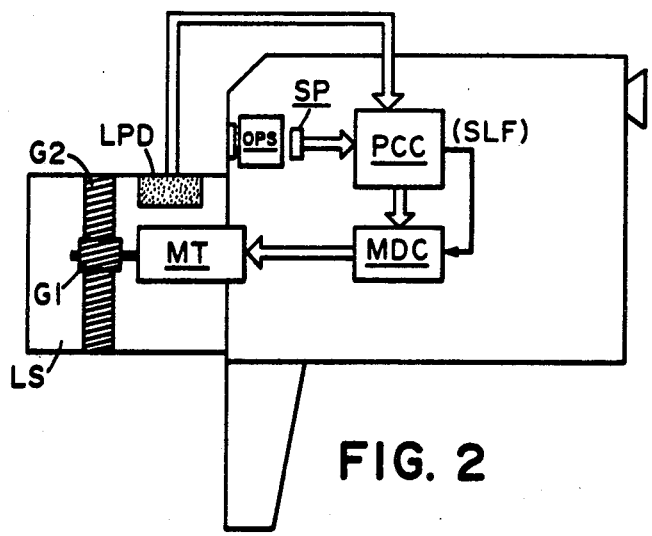
FIG. 1
FIG. 2

AUTOMATIC FOCUSING DEVICE WHICH INHIBITS FOCUSING WHEN A LOW CONTRAST SCENE IS SENSED

BACKGROUND OF THE INVENTION

1. Field of the Invention

The present invention relates to an automatic focusing device and, more particularly, to an automatic continuous focusing device wherein two detected images of an object formed by a distance detecting optical system with a relative distance therebetween associated with the object distance are scanned by a scanning means, the scanning signals thus obtained are quantized by a quantizing means to generate quantized picture element data, the relative distance between the two detected images is detected by operation means on the basis of the quantized picture element data, and an imaging optical system to be focused on the object is controlled by a control means for focusing it according to the detection result.

2. Description of the Prior Art

Some automatic focusing devices of the type described above have been proposed. For example, in the specifications of U.S. Pat. Nos. 4,004,852 and 4,078,171 (corresponding Laid-open Japanese patent application No. 51-153433), examples of an automatic focusing device are disclosed according to which two detected images formed by a distance detection optical system of stationary base line distance measuring unit type having no moving parts with a relative distance therebetween corresponding to the object distance are scanned by a solid image pickup element such as a line type image sensor, the scanning picture element signals thus obtained are converted into binary signals (quantized) by a binary encoder (quantizing means) to generate binary picture element data (quantized picture element data) consisting of signals of logic values "0" and "1", the relative distance between the two detected images is detected by a digital arithmetic means according to the binary picture element data to obtain an object distance, the data on the object distance is compared with data on the position of an imaging optical system to be focused on the object on the optical axis to generate control signals, and the imaging optical system is controlled by a control means including drive means such as a motor for focusing it on the object in response to the control signals. In particular, in the device disclosed in the U.S. Pat. No. 4,004,852, a method is adopted according to which data on an image of a first field of view as a reference with respect to an object for detection of an object distance and data on an image of a second field of view wider than the first field of view (number of data handled for the first and second fields of view are different and the number of data for the second field of view is greater than the other) are obtained, and a position of an image part in the second field of view corresponding to the image in the first field of view or most resembling it is detected to thereby obtain distance data with respect to the infinite object distance as a reference.

Unlike the device disclosed in U.S. Pat. No. 4,004,852 described above which adopts the method of comparing data on the position of the imaging optical system with the obtained absolute distance data, U.S. patent application Ser. No. 944,974 filed on Sept. 22, 1978, now U.S. Pat. No. 4,305,657 (corresponding to British Patent Application Publication No. 2009553) of the present assignee discloses an example of an automatic focusing device according to which part of the system associated with the second field of view is movable and is finely moved on a solid pickup element in association with the control of the imaging optical system so that the image part of the second field of view corresponding to the image of the first field of view or resembling it may be situated at a predetermined position, whereby focusing of the imaging optical system may be accomplished.

In a device of this type, particularly since the scanning signals of the detected images of an object are quantized to generate the quantized picture element data and the distance detection or the focus detection is performed according to this quantized picture element data, correct detection may not be achieved when the contrast of the object is low, resulting in very unstable control of the imaging optical system and occasionally in very erratic operation. When the contrast of an object is low, the possibility increases that the binary data which is obtained by slicing at a predetermined threshold level may all be converted to the same data, that is, the possibility of conversion to signals of a single logic value "1" or "0" increases. When such a phenomenon occurs, correct detection becomes impossible. Especially when a solid pickup element is used as has been described hereinabove, non-uniformity of the sensitivity of the photosensor elements also becomes a big factor, contributing to the phenomenon described above.

Especially with a camera for continuous photography such as an 8 mm movie camera or a video camera, the subject changes continuously. Therefore, when an automatic focusing device as described above is mounted to a camera of this type, and when the subject changes from an object of high contrast to an object of low contrast or of solid color, correct detection may be performed with the object of high contrast but correct detection may or may not be performed with the object of low contrast or of solid color, resulting in very unstable control operation of the photographic lens and occasionally very erratic operation.

SUMMARY OF THE INVENTION

The present invention has been made in consideration of this and has for its primary object to solve these problems associated with the conventional automatic focusing device of the type wherein the images are scanned and the scanning signals are quantized.

It is another object of the present invention to provide an automatic focusing device which prevents unstable or erratic operation of the focusing control which may otherwise be caused due to unreasonable quantization into the quantized picture element data which is attributable to the low contrast of an object or the like.

It is still another object of the present invention to provide an advantageous improvement which solves the problems as described above in an automatic continuous focusing device of the type wherein two detected images of an object formed by a distance detection optical system with a relative distance associated with the object distance are scanned by a scanning means, the scanning signals thus obtained are quantized by a quantizing means to generate quantized picture element data, the relative distance between the two detected images is detected by operation means according to the quantized picture element data, and the imaging optical system to be focused on the object is controlled by a control means for focusing it according to the detection result.

In order to achieve the above and other objects, the present invention provides an automatic focusing device of the type which performs image scanning and quantization of the scanning signals characterized in that a means is further incorporated for invalidating control of the imaging optical system by the control means for automatic focusing when the quantization of the scanning signals for the detected images is not sound or reasonable, after detecting the quantized condition of the scanning signals obtained with a scanning signal quantizing means.

In association with the characteristic construction of the present invention, as preferred embodiments of the present invention, the description of which is to follow, are proposed examples of an automatic focusing device of the construction according to which the quantizing means performs quantization of the signals according to different first and second quantized references, computation for automatic focusing is performed according to quantized picture element data generated based on the first quantized reference, detection of the quantized condition of the scanning signals obtained with the quantizing means is performed by an erratic operation preventive means according to quantized picture element data generated based on the second quantized reference, and the second quantized reference is lower than the first quantized reference. These improved constructions are further effective for preventing unstable automatic focusing.

These and other objects and features of the present invention will become apparent from the following description when taken in conjunction with the accompanying drawings.

BRIEF DESCRIPTION OF THE DRAWINGS

The embodiments of the present invention will be described with reference to the accompanying drawings in which:

FIG. 1 is a schematic block diagram showing one embodiment of the present invention;

FIG. 2 is a model view showing the case wherein the automatic continuous focusing device shown in FIG. 1 is mounted in a camera for continuous photography such as an 8 mm movie camera or a video camera;

DETAILED DESCRIPTION OF THE PREFERRED EMBODIMENTS

Figure 3:
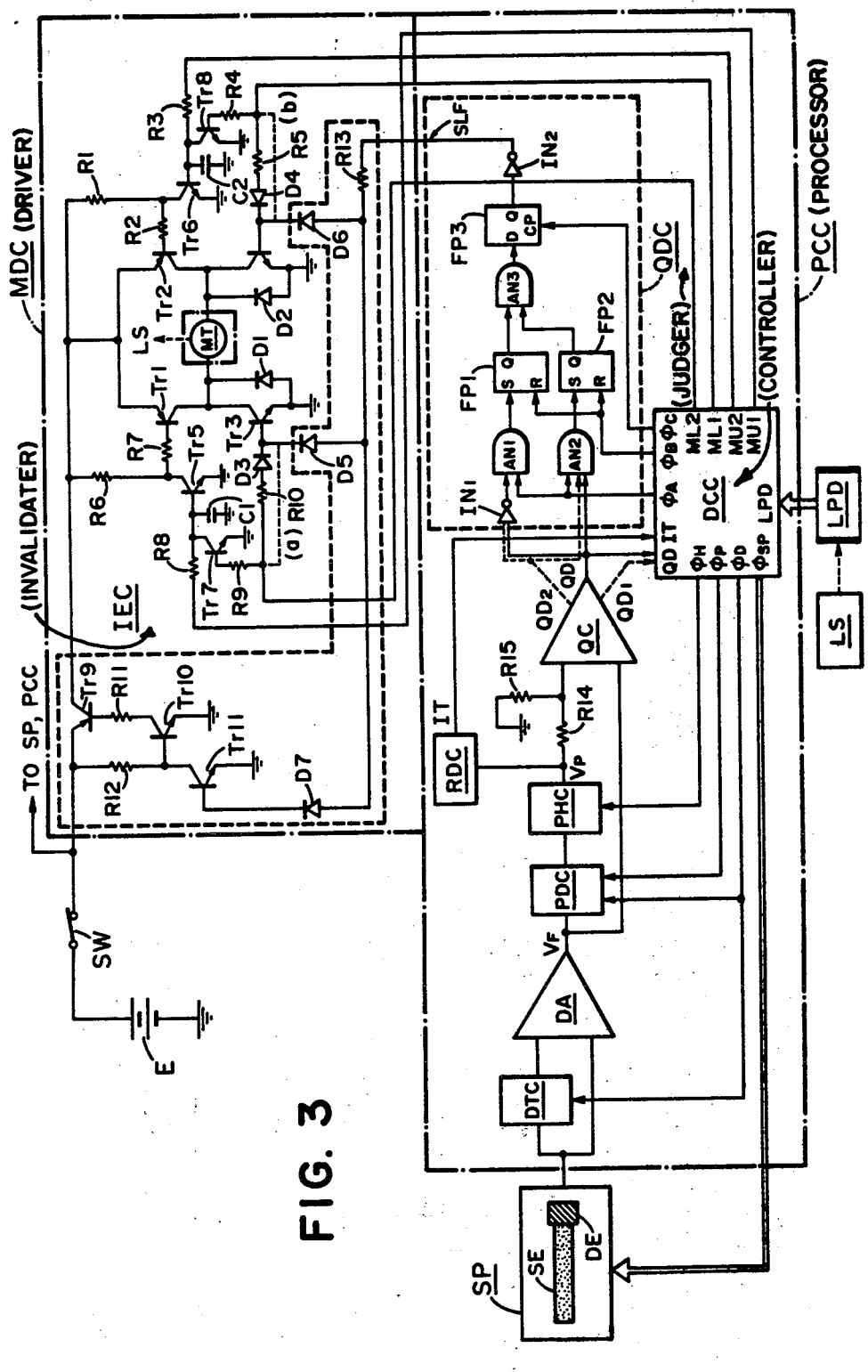
FIG. 3 is a circuit diagram showing the construction of the main part of the signal processing and control circuit shown in FIGS. 1 and 2 which is particularly related to the present invention, the construction of the motor drive circuit, and the construction of the erratic operation preventive means according to the improvement provided by the present invention.

FIG. 1 is a schematic block diagram of one embodiment of the present invention wherein symbol OPS denotes a distance detection optical block (optics) of stationary base line distance measuring unit type having mirrors M1 and M2, lenses L1 and L2, and a prism PR with reflecting surfaces M3 and M4; and SP denotes a one-dimensional solid pickup element. An image of an object OB1 or OB2 is focused through the optical block OPS on the solid pickup element (pickup) SP. An image IM1 formed via the mirror M1, the lens L1, and the reflecting surface M3 is a reference image, and an image IB1 or IB2 obtained via the mirror M2, the lens L2, and the reflecting surface M4 is an actual image. The object distance to the object OB1 or OB2 is measured by detecting the relative distance between the reference image IM1 and the actual image IB1 or IB2 by a signal processing and control circuit (processor) PCC. Focus detection data is obtained by comparing this distance data with data on the position of a photographic lens (lens) LS on its optical axis (output data from a lens position data output means LPD). The focus detection data is supplied to a motor drive circuit MDC through output terminals MU1, MU2, ML1 and ML2. The photographic lens LS is placed at the focal point with respect to the object OB1 or OB2 by a lens drive motor (motor) MT through the motor drive circuit (driver) MDC. Symbol SLF denotes a control terminal of an erratic operation preventive means incorporated in the signal processing and control circuit according to the present invention and is connected to a control part within the motor drive circuit MDC.

FIG. 2 shows an embodiment wherein the automatic continuous focusing device as described above is mounted in a camera for continuous photography such as an 8 mm movie camera or a video camera. The same reference characters are used to refer to like elements in FIG. 1. Referring to FIG. 2, symbol G1 denotes a pinion gear mounted on a rotational shaft of the motor MT, G2 is a focus ring drive gear mounted on a focus ring of the photographic lens LS, and LPD is the lens position data output means such as a gray code plate, a digital encoder or the like for supplying the control data for the photographic lens LS to the signal processing and control circuit PCC. The signal processing and control circuit PCC compares the data on the object distance obtained by processing the output of the solid pickup element SP with the data on the position of the photographic lens LS on its optical axis supplied from the lens position data output means LPD. As a result of this comparison, the signal processing and control circuit PCC outputs focus detection data consisting of signals of high and low levels, that is, focus control signals, through its output terminals MU1, MU2, ML1 and ML2. In response to these focus control signals, the motor drive circuit MDC drives the motor MT for achieving focusing by controlling the position of the photographic lens LS with respect to the object.

Describing the function of the object distance detection in the signal processing and control circuit PCC, in the optical block OPS, the system consisting of the mirror M1, the lens L1, and the reflecting surface M3 is a reference system for the object. An image of the object formed via this reference system, that is, the reference image, is formed at substantially the same position on the solid pickup element SP irrespective of the object distance. On the other hand, the system consisting of the mirror M2, the lens L2, and the reflecting surface M4 is an actual system for referring to the object at a position spaced apart from the reference system by a predetermined base line distance in the lateral direction. The image of the object formed by the actual system, that is, the actual image is formed at a position corresponding to the object distance on the solid pickup element SP; the actual image is formed at a position shifted to the left in FIG. 1 when the object is far, and it is formed at a position shifted to the right when the object is near. Therefore, in the linear arrangement of the sensor elements in the solid pickup element SP, a predetermined number of sensor elements sufficient for detection of the reference image (the range of the depth of field determined in this manner will be referred to as the reference field of view) is available for the reference system, and a predetermined number of sensor elements sufficient to cover the range of movement of the actual image, which is thus greater than the former predetermined number for the reference field of view, (the range determined in this manner will be referred to as an actual field of view) is available for the actual system. The positions of the image in the actual field of view and the image in the reference field of view are detected by, for example, utilizing the focal point corresponding to an infinite object distance as a reference, whereby detection of a distance using this reference point may be accomplished. For this purpose, the digital correlation method is adopted herein. The scanning picture element signals output from the solid pickup element SP are first converted into (quantized) binary signals of logic values "1" or "0" based on a threshold value determined by the peak value of the scanning picture element signals for the reference field of view. Among the binary picture element signals, those binary picture element signals corresponding to the image of the reference field of view and those of the actual field of view are stored in a memory circuit comprising shift registers or the like. Thereafter, the binary picture element signals for the image of the reference field of view and the binary picture element signals for the image of the actual field of view are compared with each other bit by bit from the locations corresponding to the infinite distance to form sets of continuous picture elements which are equal in number but are sequentially shifted from each other by one picture element. At each comparison operation, the number of coincidences is counted until the maximum number of coincidences, that is, until maximum correlation is obtained. Then, the number of comparisons made until this maximum number of coincidences is obtained, that is, the data on the position of the image part which resulted in maximum correlation in the actual field of view, is obtained. Thus, this image part which resulted in maximum correlation is considered as the image part corresponding to the reference image, so that data on the position of this image part in the actual field of view may be obtained as distance data utilizing the focal point corresponding to an infinite object distance as a reference.

The signal processing and control circuit PCC functions to detect the object distance in the manner as has been described above. The distance data described above is obtained as digital data of a predetermined bit number. On the other hand, the lens position data output means LPD outputs lens position data as digital data of the same number of bits, taking the infinite distance focal point as a reference. Then, the signal processing and control circuit PCC compares both data and outputs logic signals indicative of out-of-focus (the focal point is deviated to the front or to the back of the depth of field) or correct focusing from its output terminals MU1, MU2, ML1 and ML2.

Referring to FIG. 3, description will now be made on the construction of the main part of the signal processing and control circuit PCC particularly related to the present invention, the construction of the motor drive circuit MDC, and the construction of the erratic operation preventive means incorporated in these circuits according to the present invention. The same reference characters are used to refer to like elements in FIGS. 1 and 2.

In the solid pickup element SP shown in FIG. 3, SE denotes a photosensitive picture element part and DE denotes a non-photosensitive dummy picture element part. When reading the output of the solid pickup element SP, the signal processing and control circuit PCC first detects and holds, at a dark current signal detecting and holding circuit DTC, dark current signal data obtained at the dummy picture element part DE in response to a pulse $\phi D$ from an operation and control circuit (controller) DCC. The signal processing and control circuit PCC subsequently subtracts, at a differential amplifying circuit DA, the dark current signal components from picture image data (the scanning picture element signals) obtained at the photosensitive picture element part SE to thereby obtain picture image data (the scanning picture element signals) VF which is compensated for the dark current. Among the picture image data VF, a peak value Vp of the scanning signals from the picture element range corresponding to the reference field of view is determined in response to a pulse $\phi p$ from the operation and control circuit DCC, is detected by a peak detecting circuit PDC, and is then held by a peak value holding circuit PHC according to a pulse $\phi H$ from the operation and control circuit DCC. The peak detecting circuit PDC is reset in response to a pulse $\phi D$ from the operation and control circuit DCC. The peak value Vp is divided by resistors R14 and R15 and the picture image data VF is quantized by a quantizing circuit QC taking the value $$\frac{R15}{R14 + R15} \times V_p$$

as the threshold level. Although the quantizing circuit QC may comprise an A/D converter, a comparator or the like, a comparator for binary data having the value obtained from the peak value Vp as a threshold level is used in this embodiment. RDC denotes a judging circuit for judging whether or not the peak value Vp is within a suitable range. When the peak value Vp is outside the suitable range, the charge storing time of the solid pickup element SP is controlled by a group of pulses $\phi SP$ in response to the output IT from the judging circuit RDC so that the peak value Vp may fall within the suitable range.

The picture image data VF is converted into signal levels of logic values "1" or "0" according to its level at the quantizing circuit QC relative to the threshold level based on the peak value Vp of the scanning signals of the reference field of view (e.g., 0.8×Vp). The quantized picture image data QD thus obtained are input to the operation and control circuit DCC which governs the functions of object distance detection by the digital correlation method described above and the focusing of the photographic lens LS. The quantized picture image data QD are also input to a quantized condition judging circuit (judger) as a detecting part of the erratic operation preventive means according to the improvement provided by the present invention, the quantized condition judging circuit QDC comprising inverters IN1 and IN2, AND gates AN1 to AN3, RS flip-flops FP1 and FP2, and a D flip-flop FP3. The quantized condition judging circuit QDC judges whether or not the quantized condition is reasonable or not, more specifically, whether or not all of the binary picture element signals for the reference field of view and the control field of view are "1" or "0".

In the motor drive circuit MDC, symbols R1 to R10 denote resistors; Tr1 and Tr2, pnp transistors; and Tr3 and Tr4, npn transistors, the transistors Tr1 to Tr4 constituting a bridge circuit to control forward and reverse rotation of the drive motor MT for driving the photographic lens. Symbols D1 and D2 denote diodes for facilitating braking for stopping the motor MT, D3 and D4 denote reverse rotation preventive diodes, and Tr5 and Tr6 denote control transistors for the transistors Tr1 and Tr2. Delay capacitors C1 and C2 are disposed at bases of the transistors Tr5 and Tr6 to delay the turning on and off of the transistors Tr5 and Tr6 by a certain length of time. The turning on and off of the transistors Tr5 and Tr6 may otherwise be shortened by discharging the delay capacitors C1 and C2 through transistors Tr7 and Tr8, thus driving the photographic lens LS in a stable manner.

In the motor drive circuit MDC, symbol IEC denotes a lens control invalidating circuit as a control part of the erratic operation preventive means according to the improvement provided by the present invention. In this lens control invalidating circuit (invalidater) IEC, symbols R11 to R13 denote resistors; D5 to D7, diodes; Tr9, a pnp transistor; and Tr10 and Tr11, npn transistors. These parts constitute a circuit for instantaneously stopping the drive motor MT for driving the photographic lens in response to an output SLF of high level from the quantized condition judging circuit QDC.

E denotes a power source (battery) and SW denotes a power source switch.

The operation and control circuit DCC has functions of controlling the circuits DTC, PDC, PHC and QDC and driving and controlling the solid pickup element SP. In addition to this, the operation and control circuit DCC detects the object distance by the digital correlation method as described above based on the quantized picture image data QD from the quantizing circuit QC. The operation and control circuit DCC also compares the lens position data from the lens position data output means LPD with the obtained object distance data to output lens control signals through the output terminals MU1, MU2, ML1 and ML2. The output signals from the output terminals MU1, MU2, ML1 and ML2 are, for example, as shown in Table 1 below:

TABLE 1

| Terminal | Condition | | |
|---|---|---|---|
| | Near-Focus | In-Focus | Far-Focus |
| MU1 | L | L | H |
| MU2 | H | L | L |
| ML1 | L | H | H |
| ML2 | H | H | L |

H: High Level;
L: Low Level

As an example of the specific construction of the operation and control circuit DCC having these functions, there may be adopted the circuit construction as shown in FIG. 9 of U.S. patent application Ser. No. 121,690 filed on Feb. 15, 1980, now U.S. Pat. No. 4,329,033, of the present assignee. Similarly, the construction as shown in FIGS. 3, 7A and 7B of this U.S. patent application may be adopted as the construction for the solid pickup element SP and the circuits DTC, DA, PDC, PHC, RDC and QC.

The mode of operation of the circuit shown in FIG. 3 will be described with reference to the timing chart shown in FIG. 4.

Figure 4:
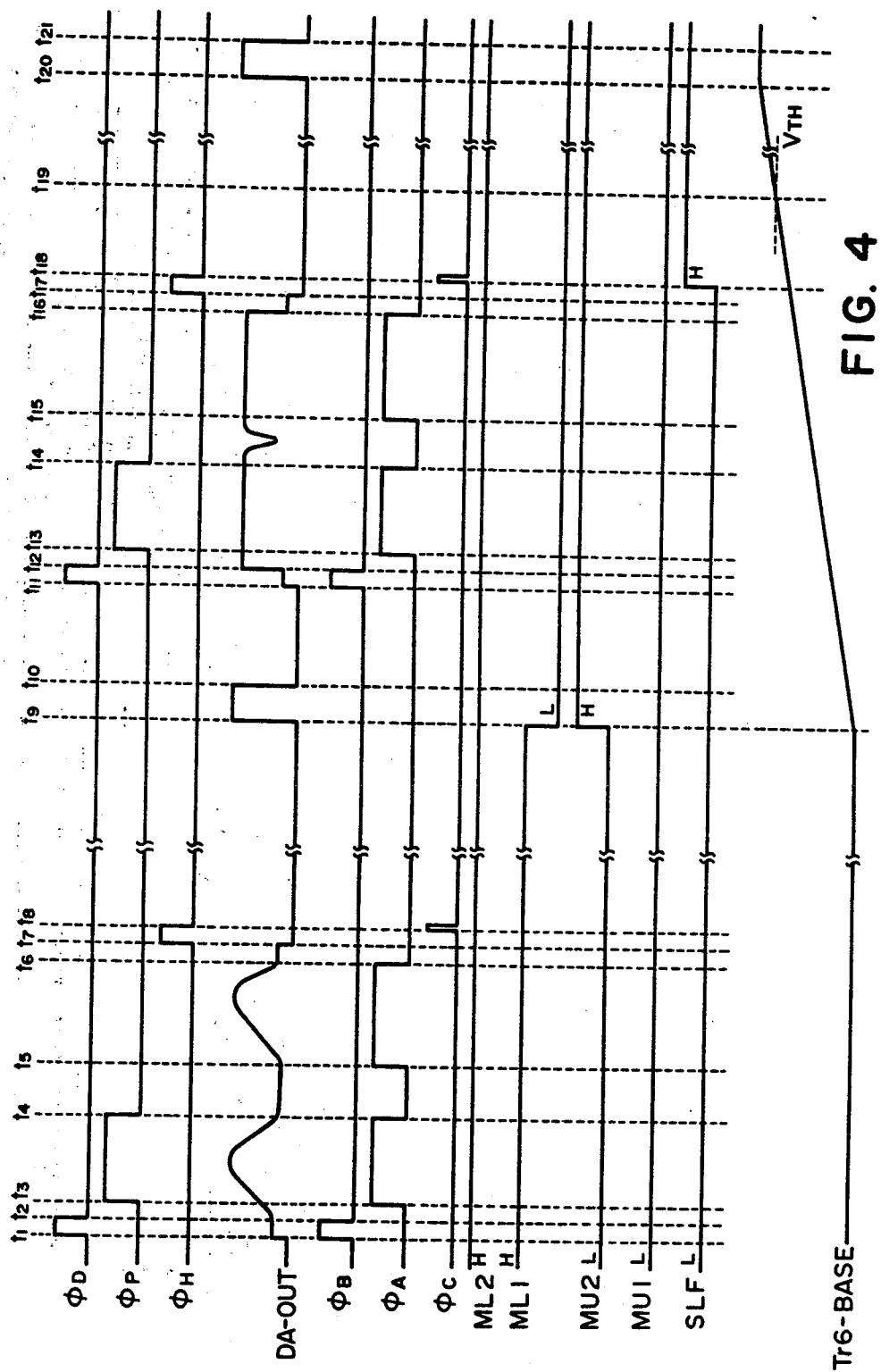
FIG. 4 is a timing chart for explaining the operation of the circuit of FIG. 3.

Referring to FIG. 4, focus detection data is periodically output from the control signal output terminals MU1, MU2, ML1 and ML2 of the operation and control circuit DCC at times t9, t20, ... and is held until the next focus detection datum is output.

During the period of time t1 to t9, it is assumed that the photographic lens LS is set at the in-focus point according to the focus detection data obtained before time t1. In this case, since the output terminals MU1 and MU2 are at low level and the output terminals ML1 and ML2 are at high level, the transistors Tr3 and Tr4 are turned on, the transistors Tr1 and Tr2 are turned off, and the two ends of the motor MT are short-circuited to stop the motor MT. Referring to FIG. 4, symbol $\phi D$ denotes a pulse for dark current signal detection by the solid pickup element SP and for resetting the peak value detecting circuit, $\phi P$ denotes a picture element range specifying pulse for detection of the peak value, $\phi H$ denotes a peak value holding pulse, $\phi B$ denotes a resetting pulse for resetting the flip-flops FP1 and FP2 in the quantized condition judging circuit QDC, $\phi A$ denotes a picture element range specifying pulse for judging the quantized condition for the AND gates AN1 and AN2, and $\phi C$ denotes a latch pulse for the flip-flop FP3. These pulses are all output from the operation and control circuit DCC.

When the contrast of the object becomes low under the in-focus condition of the photographic lens LS as shown by DA-OUT in the period from time t2 to t6, i.e., the output from the differential amplifying circuit DA, the effects of the non-uniformity of the solid pickup element SP become predominant and erratic focus detection data may be output. However, even under such a condition, if signals are input which are not of single level, that is, if data including signals of "1" or "0" are input as the quantized picture element data of the images of the reference field of view and the actual field of view, the Q outputs of the flip-flops FP1 and FP2 are inverted to high level to thereby hold the signals of high level at the flip-flop FP3. Then, the Q output of the flip-flop FP3 becomes high level, and the output from the terminal SLF becomes low level. Then, the motor drive circuit MDC controls the motor MT in response to the control signals from the output terminals MU1, MU2, ML1 and ML2 of the operation and control circuit DCC. It is now assumed that the operation is performed in the period of time t3 to t9, the erratic focus detection data due to an object of relatively low contrast is output at time t9, and the output at the terminal ML1 is then inverted to low level and the output terminal MU2 is inverted to high level. Then, transistors Tr4 and Tr8 are turned off. The delay capacitor C2 for preventing unstable operation starts charging to turn on the transistor Tr6 at a time when the stored charge reaches the threshold value VTH of the transistor Tr6. A current flows to the motor MT through the transistors Tr2 and Tr3, and the photographic lens LS begins to be driven in an erroneous direction. When the contrast of the object becomes very low during the period of time t12 to t16, the quantized data become signals of single level alone. Since new focus detection data may not be obtained under this condition, the erroneous focus detection datum output at time t9 remains output. The photographic lens LS is thus driven in an erroneous direction and the image is blurred. In order to solve this problem, according to the present invention, the quantized condition judging circuit QDC is incorporated so that driving of the photographic lens LS is interrupted and the erratic operation which might otherwise result may thus be prevented when the quantized data become signals of single level. Hence, the scanning picture element signals for the object of the low contrast pattern as in the period of time t12 to t16 are all converted to quantized data of high level by the quantizing circuit QC. Although the Q output of the flip-flop FP2 may be inverted to high level at the quantized condition control circuit QDC, the output of the AND circuit AN1 remains at low level. Therefore, since the output of the AND circuit AN3 remains at low level, the flip-flop FP3 holds the signals of low level at time t13 so that the Q output of the flip-flop FP3 may become low level and the output from the terminal SLF of the quantized condition judging circuit QDC may be inverted to high level. Then, at the lens control invalidating circuit IEC, the transistor Tr11 is turned on through the diode D7, the transistors Tr10 and Tr9 are turned off, and the supply of power to the motor drive circuit MDC is interrupted. Simultaneously, since the transistors Tr3 and Tr4 are turned on through the diodes D5 and D6, the ends of the motor MT are short-circuited at the ground side and the driving of the photographic lens LS is instantaneously interrupted. In this manner, even when the contrast of the object is low and erroneous focus detection data is output from the operation and control circuit DCC, if the contrast becomes very low, the driving of the photographic lens LS is interrupted by the operation of the quantized condition judging circuit QDC, thus preventing the erratic operation of the system which may otherwise be caused by the low contrast. In this case, it is advantageous to set the time constant of the delay circuit for preventing the unstable operation (delay capacitors C1 and C2) of the motor drive circuit MDC to be slightly longer (e.g., to a time period corresponding to two cycles under the maximum integrating time of the solid pickup element SP) than the operating period of the quantized condition judging circuit QDC, that is, the operating period of the system.

The resistors R3, R5, R8 and R10 are current limiting resistors which are not necessarily required if constant current signals are output through the output terminals MU1, MU2, ML1 and ML2 from the operation and control circuit DCC. Referring to FIG. 4, the period of time t9 to t10 is a resetting period of the extraneous charge on the solid pickup element SP, and the period of time t10 to t11 is a storing period for the picture image data corresponding to the object.

In the above embodiment, description has been made with reference to the case wherein the picture image data is quantized on the basis of the peak value Vp of the picture image data VF corresponding to the image in the reference field of view. However, similar advantageous effects may be obtained if the quantized data is obtained by quantizing differentiated values of the picture image data corresponding to the object according to a constant reference voltage (threshold voltage).

In the above embodiment, the quantization of the image data is performed according to a single reference value (threshold level) based on the peak value Vp of the picture image data VF corresponding to the image of the reference field of view, and the quantized condition is judged based on the quantized signals. However, it may be accomplished in the following manner. A plurality of quantized reference values (threshold levels) are set according to the peak value Vp of the picture image data corresponding to the image in the reference field of view, and the image data are quantized according to the plurality of quantized reference values. During this procedure, for example, the computation for the purpose of object distance detection is performed on the basis of a quantized signal (QD1 in FIG. 3) according to a first quantized reference value of higher level, and the quantized condition is judged on the basis of a quantized signal (QD2 of FIG. 3) according to a second quantized reference value of lower level. In this manner, the contrast may be more completely and effectively judged. Moreover, correct quantization of the picture image data may be expected when the contrast judgment is good, so that correct focus detection data may be obtained with excellent reliability.

Furthermore, as shown by the broken lines (a) and (b) in FIG. 3, by resetting the delay circuit for preventing unstable operation (capacitors C1 and C2) of the motor drive circuit MDC by signals from the terminal SLF which are output from the quantized condition judging circuit QDC, the positioning of the photographic lens LS may be more stably accomplished.

In the above embodiment, the transistors Tr3 and Tr4 and the lens control invalidating circuit IEC consisting of the transistors Tr9 to Tr11, the resistors R11 and R12, and the diodes D5 to D7, are controlled by the signals from the terminal SLF in order to prevent erratic control of the photographic lens LS. However, the outputs from the terminals SLF and ML2 and the outputs of the terminals SLF and ML1 may be received by separate OR gates to control the transistors Tr3 and Tr4 with the outputs of the respective OR gates. On the other hand, the inverted signal of the output of the terminal SLF and the output of the terminal MU2, and the inverted signal of the output of the terminal SLF and the terminal MU1 may be received by AND gates to control the transistors Tr5 and Tr6 with the outputs of the respective AND gates. Similar effects may also be obtained in this case.

Furthermore, in the above embodiment, the quantized condition judging circuit QDC judges the quantized conditions of the quantized signals of both images in the reference field of view (control signal φA in FIG. 4). However, only one of the quantized signals may be judged. For this purpose, the two periods of high level of the control signal φA in FIG. 4 may be reduced to one.

In summary, there is provided according to the improvement offered by the present invention an automatic continuous focusing device of the type wherein the image is scanned and the scanning signals are quantized, for example, an automatic focusing device wherein two detected images of an object formed by a distance detection optical system with a relative distance therebetween associated with the object distance are scanned by a scanning means, the scanning signals thus obtained are quantized by a quantizing means to generate quantized picture element data, the relative distance between the two detected images is detected by operation means on the basis of the quantized picture element data, and an imaging optical system to be focused on the object is controlled by a controlling means. According to this device, unstable operation of the quantized picture element data and erratic operations are well prevented, despite a non-suitable quantized condition of the quantized picture element data due to low contrast of the object or the like, whereby stable images may be formed constantly with a camera or the like. This improvement is thus very advantageous for an automatic focusing device of the type which is subject to changes in the contrast of the object.

In the lens control invalidating circuit IEC of the embodiment shown in FIG. 3, the power supply part consisting of the transistors Tr9 to Tr11, the resistors R11 and R12, and the diode D7 acts to interrupt supply of power to the drive circuit MDC by an output of high level from the terminal SLF of the judging circuit QDC so as not to damage the motor drive circuit MDC when the transistors Tr3 and Tr4 are rendered conductive by this output of high level. However, when such damage to the circuit may be prevented by modification of the overall circuitry, such a power supply control part may be eliminated. Here the connecting construction of the diodes D5 and D6 with transistors Tr3 and Tr4 is important for fast control of the motor MT such that the transistors Tr3 and Tr4 may be rendered conductive by the output of high level from the terminal SLF of the judging circuit QDC to ground both ends of the motor MT so as to immediately render the motor MT inoperative. However, energy saving may be achieved to a significant extent by incorporating the power supply control part as described above.

What we claim is:

1. An automatic focusing device comprising:
    sensing means for sensing an image of an object and for generating a plurality of signals therefrom;
    control means for generating a control signal;
    focusing means for focusing an optical system on the basis of the plurality of signals from said sensing means, said focusing means focusing the optical system only when said focusing means continuously detects the control signal for a predetermined time period; and
    inhibiting means having a detection period shorter than the predetermined time period, said inhibiting means detecting each of the plurality of signals from said sensing means in each detection period and inhibiting the focusing means when the plurality of signals from said sensing means are at predetermined conditions.

2. A device according to claim 1, wherein said inhibiting means inhibits the operation of said focusing means until at least the termination of the next detection period.

3. A device according to claim 2, wherein said control means produces the control signal on the basis of the plurality of signals from said sensing means.

4. A device according to claim 3 further comprising:
    quantizing means for quantizing the plurality of signals from said sensing means and for inputting the plurality of quantized signals into said control means and said inhibiting means.

5. A device according to claim 4, wherein said quantizing means compares the plurality of signals from said sensing means with a plurality of reference signals and generates a first quantized signal and a second quantized signal.

6. A device according to claim 5, wherein said inhibiting means inhibits the operation of said focusing means when only one of the first and second quantized signals is detected.

7. A device according to claim 6, wherein said inhibiting means includes first latch means for latching the first quantized signal and second latch means for latching the second quantized signal.

8. A device according to claim 7, wherein said first and second latch means are reset simultaneously before the start of each detection period of said inhibiting means.

9. A device according to either claim 3 or 8, wherein said focusing means includes drive means for driving the optical system, adding means for accumulating the control signal from said control means, and switching means for starting the operation of said drive means.

10. A device according to claim 9, wherein said adding means includes an electric condenser for integrating the control signal.

11. A device according to claim 10, wherein said drive means includes a motor of which both ends are grounded when a signal for inhibiting the operation of said focusing means is provided from said inhibiting means.

* * * * *